United States Patent [19]
Haas

[11] Patent Number: 5,602,804
[45] Date of Patent: Feb. 11, 1997

[54] LONG TERM RAPID COLOR CHANGING TIME INDICATOR

[75] Inventor: David J. Haas, Suffern, N.Y.

[73] Assignee: Temtec Inc, Suffern, N.Y.

[21] Appl. No.: 510,762

[22] Filed: Aug. 3, 1995

[51] Int. Cl.$^6$ ................................................. G04B 17/00
[52] U.S. Cl. .......................... 368/327; 116/206; 116/207
[58] Field of Search ............................ 368/327; 116/206, 116/207

[56] References Cited

U.S. PATENT DOCUMENTS

| | | |
|---|---|---|
| 1,454,837 | 5/1923 | Smith . |
| 2,088,567 | 8/1937 | Mck Ballou . |
| 2,337,534 | 12/1943 | Barber . |
| 2,780,015 | 2/1957 | Whitehead . |
| 2,826,073 | 3/1958 | Huyck et al. ........................ 116/206 |
| 2,896,568 | 7/1959 | Pryor et al. . |
| 3,018,611 | 1/1962 | Biritz . |
| 3,046,786 | 7/1962 | Tessem . |
| 3,078,182 | 2/1963 | Crone, Jr. et al. . |
| 3,243,303 | 3/1966 | Johnson . |
| 3,311,084 | 3/1967 | Edenbaum . |

(List continued on next page.)

FOREIGN PATENT DOCUMENTS

| | | |
|---|---|---|
| 0451888 | 10/1991 | European Pat. Off. . |
| 9104520 | 4/1991 | WIPO . |
| 9106853 | 5/1991 | WIPO . |
| 9213724 | 8/1992 | WIPO . |
| 9300669 | 1/1993 | WIPO . |

(List continued on next page.)

Primary Examiner—Bernard Roskoski
Attorney, Agent, or Firm—Michael E. Zall

[57] ABSTRACT

The time indicator device of this invention is provided with a display layer with at least one defined display region therein. A migration layer is provided which overlies and is attached to the display layer. The migration layer has at least one migration region therein and in use each migration region is in contact with at least one display region. An activation layer is provided which has at least one defined activation region therein. The activation region includes a migrating agent capable of migrating laterally through the migration region. When the activation layer overlies the migration layer, each activation region overlies at least one migration region. The migration region connects each activation region with at least one display region which is laterally distal from the activation region. In use and in order to activate the device the activation layer and migration layer are adhesively attached to each other. When the activation layer is contacted with and overlies the migration layer, each activation region contacts at least one migration region. Upon contact the migrating agent is activated to migrate laterally from the activation region through the migrating region to at least one display region in a predetermined amount of time to cause an indication in the display region that the predetermined amount of time has elapsed. Preferably, the device has a plurality of defined display regions, defined activation regions and/or migration regions to provide a means for adjusting the predetermined time, adjusting for environmental conditions and to provide a plurality of elapsed times.

10 Claims, 4 Drawing Sheets

U.S. PATENT DOCUMENTS

| | | | |
|---|---|---|---|
| 3,480,402 | 11/1969 | Jackson . | |
| 3,520,124 | 7/1970 | Myers . | |
| 3,921,318 | 11/1975 | Calavetta . | |
| 3,954,011 | 5/1976 | Manske . | |
| 3,962,920 | 6/1976 | Manske . | |
| 3,999,946 | 12/1976 | Patel et al. . | |
| 4,028,876 | 6/1977 | Delatorre . | |
| 4,154,107 | 5/1979 | Giezen et al. | 116/206 |
| 4,195,058 | 3/1980 | Patel . | |
| 4,212,153 | 7/1980 | Kydonieus et al. . | |
| 4,212,393 | 7/1980 | Lenkoff . | |
| 4,229,813 | 10/1980 | Lilly et al. . | |
| 4,292,916 | 10/1981 | Bradley et al. . | |
| 4,382,063 | 5/1983 | Romito et al. . | |
| 4,382,700 | 5/1983 | Youngren . | |
| 4,404,922 | 9/1983 | Morane et al. . | |
| 4,408,557 | 10/1983 | Bradley et al. . | |
| 4,428,321 | 1/1984 | Arens | 116/207 |
| 4,432,630 | 2/1984 | Haas . | |
| 4,432,656 | 2/1984 | Allmendinger | 116/206 |
| 4,542,982 | 9/1985 | Haas . | |
| 4,573,711 | 3/1986 | Hyde . | |
| 4,629,330 | 12/1986 | Nichols . | |
| 4,643,122 | 2/1987 | Seybold . | |
| 4,643,588 | 2/1987 | Postle et al. . | |
| 4,646,066 | 2/1987 | Banghman et al. . | |
| 4,737,463 | 4/1988 | Bhattacharjee et al. . | |
| 4,779,120 | 10/1988 | Haas . | |
| 4,812,053 | 3/1989 | Bhattacharjee . | |
| 4,822,990 | 4/1989 | Tamada et al. . | |
| 4,824,827 | 4/1989 | Kelly et al. . | |
| 4,846,095 | 7/1989 | Emslander . | |
| 4,846,502 | 7/1989 | Chang et al. . | |
| 4,903,254 | 2/1990 | Haas . | |
| 4,917,503 | 4/1990 | Bhattacharjee . | |
| 4,987,849 | 1/1991 | Sherman . | |
| 5,045,283 | 9/1991 | Patel . | |
| 5,053,339 | 10/1991 | Patel . | |
| 5,058,088 | 10/1991 | Haas et al. . | |
| 5,107,470 | 4/1992 | Pedicano et al. . | |
| 5,293,648 | 3/1994 | Finley . | |
| 5,317,987 | 6/1994 | Muller et al. . | |
| 5,364,132 | 11/1994 | Haas et al. . | |
| 5,378,430 | 1/1995 | Nieves et al. . | |

LONG TERM RAPID COLOR CHANGING TIME INDICATOR

BACKGROUND OF THE INVENTION

1. Field of the Invention

This invention relates to a time indicator and, in particular, to a long term time indicator which provides a rapid and clear indication of expiration.

2. Description of the Related Art

Numerous devices are known which provide, after activation, a visual indication of the passage of a predetermined amount of time. Such a time indicator is useful, for example, as a security badge, as an indicator of the length of time a perishable item has been on the wholesaler's or retailer's shelf and for numerous other uses.

A problem that generally exists with such a time indicator is that it gradually changes color over a period of time and it is difficult to ascertain the completion of the time interval. What is required for a long term time indicator is a technology wherein the dye does not begin to appear until the end or near the end of the time interval. Such a time indicator remains unchanged (white or clear) until near the end of the time interval, and then the color (or image) rapidly or, ideally, instantaneously appears. In essence, what is desirable is a time switch (a color-appearing step-function from white to dark), which stays white until the end of the time interval and then produces a step-function, meaning an instantaneous or rapid color change to clearly show that the time interval has ended.

Earlier technologies, are only useful for short time intervals such as days or weeks. They are not useful for longer time intervals such as months because the color change occurs by dye diffusion which begins the instant the activating adhesive cover is applied over these printed dyes. Even though the dye may be very slow in migrating to become visible, it is a problem for the observer in identifying exactly when the image or color indicates the actual time interval has occurred. The time interval for the image appearance, from white to colored due to the dye migration (say 10–20% tint) is proportional to the time interval of the initial time interval for which the time indicator has been designed: in other words, if the time indicator is for two months, the actual color change to be viewed by the observer due to dye migration will be about two months.

Thus, the time indicator stays pure white for about a month; it then starts to change color. In about three months, the observer sees a definite color change of, say 10–20% tint; during the time interval between one and three months, the time indicator is in-between absolutely YES and absolutely NO, a "grey area". This lack of a sharp transition time is the problem with simple dye diffusion systems.

Many of the known time indicators, which are generally short term time indicators are based on the migration of ink from one substrate through another substrate, i.e. in a path perpendicular to the surface of the substrate. After the ink migrates through the substrate(s) it is viewed on a display surface to thereby indicate that the predetermined time has elapsed.

U.S. Pat. No. 4,903,254 to Haas describes a time indicator comprising a number of layers that are adhered together. The indicator has a front part and a rear part. The rear part includes an ink film layer upon a backup layer. At issuance, the front part and rear part are adhered together and the ink migrates from the rear part into the front part.

U.S. Pat. No. 5,364,132 Haas et al. describes a reusable self-expiring security identification badge. When the badge is issued, the inked substrate is attached to the base substrate, the inked substrate covering the void indicia area. The overlay substrate is then placed over and attached with the soluble ink of the ink substrate. The ink dissolver of the overlay substrate contacts and co-acts with the soluble ink of the inked substrate to dissolve the ink and allow the ink to migrate through to the overlay substrate to the display surface, where it can be visually perceived, in a preselected time interval.

U.S. Pat. No. 3,520,124 to Myers, describes a parked car time indicator. The device includes a first sheet having a first reactant and a second sheet having a second reactant and a release sheet which is peeled away to permit contact of the first sheet with the second sheet. Such contact begins a reaction which extends over a selected time interval and terminates with a color change of the device.

U.S. Pat. No. 4,154,107 to Giezen et al. describes a time temperature indicating device having an indicator layer and a signalling component which when in contact with the indicating layer causes the indicator layer to undergo a visually perceptible change.

U.S. Pat. No. 4,212,153 to Kydonieus, et al. describes a laminated indicator which changes in a visually perceptible mode with the passage of time. The indicator comprises at least two layers whereby the molecular migration of an agent in an interior layer to the outermost surface of the exterior layer causes a change which is visually perceptible.

U.S. Pat. No. 5,045,283 to Patel describes a device comprising an activator tape which includes an activator composition and an indicating tape which includes an indicator composition. The tapes are adhesively bound together to form a wedge-shaped composite matrix. The activating composition diffuses through the increasingly thicker composite matrix to contact the indicating composition to produce a visually observable color change at the temperature being monitored. The color change appears as a moving boundary at the color/non-color interface which moves transversely along the length of the device toward the thicker end.

U.S. Pat. No. 5,107,470 to Pedicano describes a quick acting indicator comprising a migrating ink that migrates through an opaque layer to display a message. Upon removal of a release paper, a coated indicator portion is brought into contact with a printed base portion, and a printed message migrates through a non-curing layer to display the printed message.

U.S. Pat. No. 5,317,980 to Muller et al. describes a time indicator comprising chemical substances separated by a barrier. When the barrier is corroded or removed the chemicals act to cause a visible color change.

Other known time indicators are based on the migration of liquids or jelly through wicks to indicate the passage of time.

For example, U.S. Pat. Nos. 3,954,011 and 3,962,920 to Manske describe a time indicating device which includes a porous fluid-carrying pad, a wick material and an indicator means whereby the progress of fluid along the wick material can be visibly indicated and used to measure the passage of time, the exposure to a given minimum temperature or time-temperature relationship.

U.S. Pat. No. 4,028,876 to Delatorre describes an apparatus for visually indicating elapsed time by a color change which comprises a transparent flexible container having a rupturable sealed capsule therein containing a chromophoric compound. The capsule when ruptured permeates into another capsule contained within the container to combine with another chromophoric compound to form a colored body after the predetermined time has elapsed.

U.S. Pat. No. 4,229,813 to Lilly, et al. describes a time indicator which utilizes an ampule reservoir of silicon oil which, after crushing of the ampule, releases the silicon oil which is slowly absorbed onto and moves up a porous strip at a rate which is a function of time. One side of the strip is printed with an oil soluble ink, while the other side is unprinted. The printed side of the strip is laminated to an unprinted strip. As the silicon oil moves up the strip, the oil contacts the ink causing a dye in the ink to migrate from the printed side to the unprinted side, thus providing a measurable color front moving up the strip.

U.S. Pat. No. 4,382,700 to Youngren describes an indicator which contains a capsule of mineral jelly which is in contact with a wick, such that the mineral jelly diffuses into the wick in accordance with the changes in ambient temperature over a period of time.

U.S. Pat. Nos. 4,292,916 and 4,408,557 to Bradley, et al. describe, in several embodiments, a time indicator wherein a migrating carrier mixture is caused to flow by rupturing or depressing a capsule. The carrier mixture contacts an absorptive layer and migrates along the absorptive layer. The progress of this migration can be observed. Of particular relevance to the invention described and claimed herein is the embodiment associated with FIG. 9 (col.6).

U.S. Pat. No. 4,432,656 to Allmendinger describes a time/temperature integrator for indicating the history of a deep frozen product through diffusion of water along a cellulose wick.

U.S. Pat. No. 4,629,330 to Nichols describes a color change indicator of time and temperature. The device includes a reservoir of liquid having a predetermined index of refraction and a rate of evaporation. The liquid is covered by an opacifying layer of microporous material. The opacifying layer has an index of refraction approximately the same as that of a liquid and has an open cell network of pores for absorbing liquid from the reservoir. The layer is in a first radiation scattering condition when the liquid occupies the layer and after a specified period of time in a second scattering condition when the liquid is depleted from the layer.

U.S. Pat. No. 4,643,122 to Seybold describes a diffusion controlled security tag comprising a carrier containing a solution of a compound which changes color upon diffusion or evaporation of the solvent. The carrier is enveloped in a barrier film which controls the rate of diffusion/evaporation of the solvent from the carrier, such that a change in color of the carrier indicates undesirable storage or product tampering.

U.S. Pat. No. 5,058,088 to Haas describes a timing indicator type badge, label or display wherein the relative amount of time that has elapsed from the initial activation of the timing indicator can be easily determined by the progression of a visually perceptible change in color along different areas of the timing indicator. This timing indicator comprises a clear self-adhesive film which is placed over a printed substrate in order to activate the timing indicator. The printed substrate includes a migrating or soluble ink which migrates along the substrate to produce a visual color change.

PCT/AU90/00433 to Tothill et al. discloses a timer comprising a lamination containing a piece of porous wick material and a reservoir of liquid. The reservoir of liquid soaks into the porous wick to create a visible trace of the liquid on the porous wick. A face part of the lamination is transparent so that the visible trace can be seen.

U.S. Pat. No. 3,243,303 to Johnson discloses a temperature monitor employing a flowable aqueous composition containing dispersed polyvinyl acetate as a flow retardant. The fluid carrier is impregnated with a fluid composition which includes a coloring material. Initially the fluid composition is immobilized by freezing. As the composition is absorbed by an absorbent layer. An impermeable layer serves as a barrier but permits the fluid carrier to pass around the ends thereof to reach an indicating area. A masking layer obscures the absorbent layer and the color change taking place therein until the food reaches a central transverse opening in the masking layer, which opening registers would be an indicating layer.

U.S. Pat. No. 3,046,786 to Tessem discloses a condition responsive device arranged to indicate the extent of exposure above a certain minimum temperature point for use in connection with frozen foods. The device includes a galvanic cell parallel a porous medium impregnated with an electrolyte and which includes an indicator such as phenolphthalein which has one color in the presence of the electrolyte and which will change color an electrolytic action that is temperature dependant.

U.S. Pat. No. 2,896,568 to Pryor et al. discloses a temperature indicating device comprising substances introduced in liquid form into wells and frozen in situ, which melt and migrate out of the wells as a result of gravity or capillaries may be detected by observation.

Other indicators in the prior art rely primarily upon chemical reactions to cause a visually perceptible change over a desired time period rather than the migration of fluids or compounds. These include, for example:

U.S. Pat. No. 2,337,534 to Barber describes a magazine page exposure time indicator including a photosensitive paper sheet mounted on a magazine page, and a developed photographic film sheet having a series of adjacent portions of varying density mounted over the photosensitive paper sheet.

U.S. Pat. No. 3,018,611 to Biritz describes a time indicator including an oxygen reactive material which reacts and changes color upon exposure to oxygen.

U.S. Pat. No. 3,480,402 to Jackson describes a time indicator formed of an absorbent carrier having absorbed thereon at least one chemical compound which changes color upon exposure to oxygen.

U.S. Pat. No. 3,999,946 to Patel et al. describes a perishable product time-temperature history indicator which includes a substrate for attachment of the indicator to a product. The device includes compositions containing at least two conjugated acetylene groups which exhibit sequences of irreversible color changes at combinations of time and temperatures.

U.S. Pat. No. 4,195,058 to Patel describes a device for monitoring time-temperature histories in which a vapor is allowed to permeate through a permeable vapor to contact a liquid polydiacetylene indicator to provide a color response after a predetermined period of time.

U.S. Pat. No. 4,212,393 to Lenkoff describes "magic" pictures printed with a water soluble ink including therein one or more latent water soluble coloring materials which may be printed in a pattern of dots. When the soluble imprints of ink are contacted by a felt tip pen, the water in the pen is deposited on the paper and releases the latent coloring material thereby spreading the color along the picture.

U.S. Pat. Nos. 4,432,630, 4,542,982 and 4,779,120 to Haas describe badges with an ambient light sensitive coating thereon which when exposed to ambient light for a specified period of time change to a specified color.

U.S. Pat. Nos. 4,812,053 and 4,917,503 to Bhattacharjee et al. describe, respectively, an oxygen-sensitive and light sensitive perishable product time-temperature indicator.

U.S. Pat. No. 4,987,849 to Sherman discloses a signal device comprising two inks of like colors; an ink that is stable in the presence of light and/or air and an ink that is sensitive to light and/or air. The stable ink is applied to the device in the form of a message. The sensitive ink is applied as a background to the stable ink to camouflage the message. The device is activated by exposing it to light and/or air, whereby the sensitive ink fades and a message is left behind.

Other possibly relevant prior art includes: U.S. Pat. No. 1,454,837 to Smith for tamper evident paper; U.S. Pat. No. 2,088,567 to Ballou for a tamper evident identification card; U.S. Pat. No. 2,780,015 to Whitehead for tamper evident identification cards; U.S. Pat. No. 3,078,182 to Crone, Jr., et al. for a color changing pressure sensitive adhesive indicator tape; U.S. Pat. No. 3,311,084 to Eidenbaum for a pressure sensitive adhesive tape containing markings which change color when subjected to steam sterilizing conditions; U.S. Pat. No. 3,921,318 to Calavetta for medical history cards; U.S. Pat. No. 4,382,063 to Romito et al. for a sterility indicator device having ink spots of chromium chloride that change color over a period of time in the presence of steam; U.S. Pat. No. 4,404,922 to Morane et al. for an aging indicator having at least one closed tube of liquid which, as a function of time and temperature, gradually permeates out of the tube, the level of fluid in the tube being a measure of aging; U.S. Pat. No. 4,573,711 to Hyde for a secure credit card; U.S. Pat. No. 4,643,588 to Postle et al. for a method of monitoring if a stored product has exceeded a predetermined temperature; U.S. Pat. No. 4,646,066 to Baughman for an environmental exposure indicator which includes a tuned electrical circuit; U.S. Pat. No. 4,846,095 to Emslander for a device for indicating a temperature is above/below a critical temperature; U.S. Pat. No. 4,846,502 to Chang et al. for tamper evident documents; U.S. Pat. No. 5,293,648 to Finley for a tag for visually indicating loss of a protective agent; and U.S. Pat. No. 5,378,430 to Nieves et al. for a steam sterilization process monitor.

All of the aforedescribed devices are complicated to adjust for a selected period of time. Adjustments often involve experimentation with many types of chemicals, inks, solvents, wicks, etc. to prepare a device which can operate under the conditions expected. Most of the prior art devices gradually change color over a period of time and involve, at best, a guess on how much time has elapsed. When this is combined with the possible variations in temperature, humidity, etc. that may exist in the environment of the time indicator, the viewer has very little confidence that he is close to the expiration time of the device.

OBJECTS AND SUMMARY OF THE INVENTION

It is an object of this invention to provide an improved time indicator.

It is another object of this invention to provide an improved long term time indicator which provides an immediate and clear indication that the predetermined time has elapsed.

It is a further object of this invention to provide a low cost, easy to read time indicator.

It is still another object of this invention to provide a time indicator which is easy to activate.

It is another object of this invention to provide a time indicator which is easy to manufacture and has no liquids therein which can spill, splatter or stain.

It is still another object of this invention to provide a time indicator which can be easily and simply modified to accommodate varying environmental conditions and/or varying elapsed times.

Yet another object of this invention is to provide a time indicator which is inexpensive, simple to construct and can clearly, relatively accurately and quickly indicate the lapse of progressive selected periods of time increments.

It is yet another object of this invention to provide a time indicator which can provide information upon the passage of discrete time intervals.

Still another object of this invention is to provide a means for easily adjusting the selected period of time without cumbersome trial and error methods.

All of the afordescribed objects are achieved by the time indicator of this invention. The device is provided with a display layer with at least one defined display region therein. A migration layer is provided which overlies and is attached to the display layer. The migration layer has at least one migration region therein and in use each migration region is in contact with at least one display region. An activation layer is provided which has at least one defined activation region therein. The activation region includes a migrating agent capable of migrating laterally through the migration region. When the activation layer overlies the migration layer, each activation region overlies at least one migration region. The migration region connects each activation region with at least one display region which is laterally distal from the activation region.

In order to activate the device, the activation layer and migration layer are contacted with each other to thereby become adhesively attached to each other. When the activation layer is contacted with and overlies the migration layer, each activation region contacts at least one migration region. Upon contact, the migrating agent in the activation layer is activated to migrate laterally from the activation region through the migrating region to the display region in a predetermined amount of time to cause an indication in the display region that the predetermined amount of time has elapsed.

The device may have a plurality of defined display regions, defined activation regions and/or migration regions to provide a means for adjusting the predetermined time, adjusting for environmental conditions and to provide a plurality of elapsed times.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1:
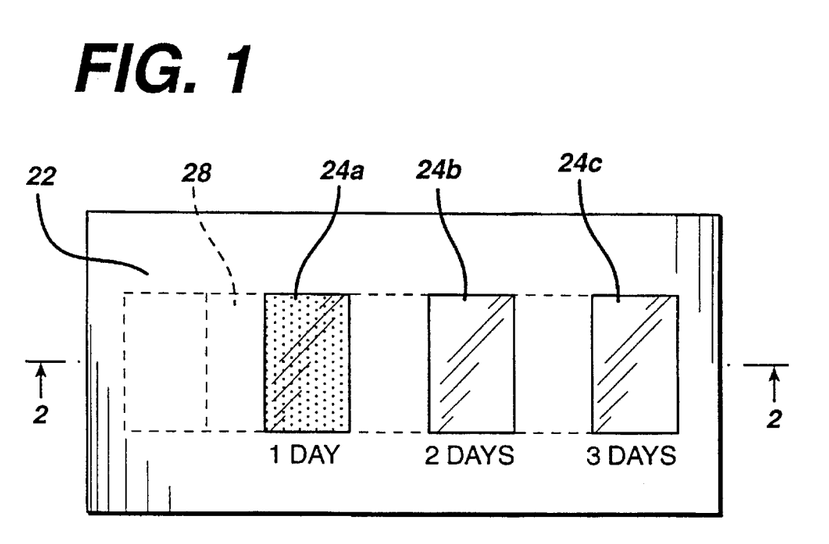
FIG. 1 is a plan view of a first embodiment of the time indicator of this invention.
Figure 2:
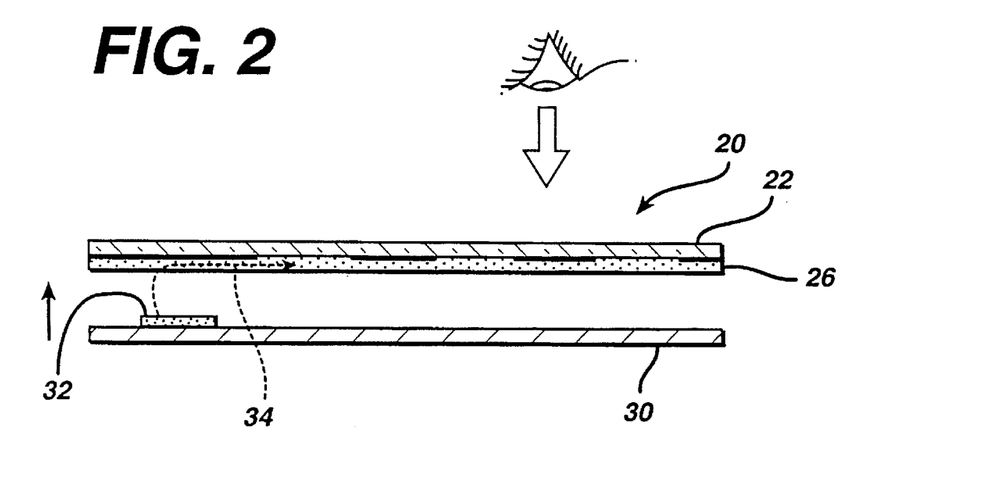
FIG. 2 is an exploded cross-sectional view taken along line 2—2 of FIG. 1.

Referring to the first embodiment of this invention depicted in FIGS. 1 and 2, the time indicator 20 this invention comprises a display layer 22 having at least one defined display region 24 therein. The first embodiment depicted in FIGS. 1 and 2 has three display regions 24(a–c). The display regions 24(a–c) can be used, for example, to indicate the passage of several days of time, e.g. display region 24a for one day, 24b for two days and 24c for three days.

Optionally, the display regions can be used to compensate for different ambient conditions. For example, the migrating dye 34 migrates more rapidly through the migration region 28, at higher ambient temperatures than at lower ambient temperatures. By placing viewing windows, i.e., display regions 24, at different positions in the display layer 22 along the migration region 28 the time indicator 20 compensates for different temperatures. For example, the viewing window for normal ambient temperatures is at the center i.e., display region 24b, the viewing window for higher ambient temperatures is at the distal end i.e., display region 24c, further away from the dye source i.e., activation region 32 and the viewing window for lower ambient temperatures is at the near end i.e., display region 24a, closer to the dye source or activation region 32. For example, the time indicator 20 can be an indicator which indicates the passage of, say, one month. Display region 24a can indicate one month if the ambient temperature is 32° F., 24b can indicate one month if the ambient temperature is 60° F. and 24c can indicate one month if the ambient temperature is 85° F.

The afordescribed configurations for the display layer 22 provides for use of the same type time indicator 20 at different temperatures and/or for differing predetermined times, for example, for aging meat, shelf life of products, etc.

In another embodiment (not shown), the migrating agent 34, e.g., colored dye migrates laterally through the migration region 28. This region 28 overlies a display region 24 which displays the migrating dye as a moving front in an analogue fashion, with the passage of time being shown by the front edge of the dye band. The display region 24 permits the observer to see the moving dye band. The relative time interval is indicated by a scale printed on, for example the display region.

Still referring to FIGS. 1 and 2, the time indicator 20 further comprises a migration layer 26 overlying and attached to the display layer 22. The migration layer 26 has at least one migration region 28 therein. In the first embodiment depicted in FIGS. 1 and 2, there is only one migration region 28 depicted. It should be understood however, that there may be a plurality of migration regions used with each migration region 28 of a different length and/or composition to provide differing predetermined times for the migrating agent 34 to traverse from the activation region 32 through each migration region 28 to the display region 24.

Each migration region 28 is in contact with at least one display region 24. In the embodiment depicted in FIGS. 1 and 2, the migration layer 26 comprises a composition which enables the layer to absorb and permit the dye used as the activating agent 34 to migrate therethrough and to function as a pressure sensitive adhesive layer. Optionally, the activation layer 30 may have an adhesive associated therewith.

The time indicator 20 of this invention further comprises an activation layer 30 having at least one defined activation region 32 associated therewith. The activation region 32 includes a migrating agent 34 capable of migrating laterally through the migration region 28. The migration region 28 upon contact with the activation region 32 (which includes an activating agent 34), initiates or activates the timing process. In the embodiment depicted in FIGS. 1 and 2, the activating agent 34 is a migrating dye that travels laterally through migration region 28. Optionally, there may be a plurality of activation regions 32 which are overlying and in contact with a plurality of migration regions 28, each one optionally including a different activation agent 34, e.g., dye which migrates at a different rate through the migration region 28 and/or has a different color.

Referring to FIGS. 1 and 2, when the activation layer 30 overlies the migration layer 26, each activation region 32 overlies at least one migration region 28. The migration region 28 connects each activation region 32 with at least one display region 24 which is laterally distal from the activation region 32.

An adhesive means is associated with the activation layer 30 or the migration layer 28 for adhesively attaching the activation layer 30 to the migration layer 26. When the activation layer 30 is contacted with and overlies the migration layer 26, the adhesive means adhesively attaches the activation layer 30 to the migration layer 26 causing each activation region 30 to contact at least one migration region 28. Upon contact, the migrating agent 34 in the migration region 30 is activated to migrate laterally from the activation region 32 through the migrating region 28 to at least one display region 24 in a predetermined amount of time to cause an indication in the display region that the predetermined amount of time has elapsed. Preferably, this is indicated when the migrating agent 34, e.g., dye becomes visible through the display region 24.

Figure 3:
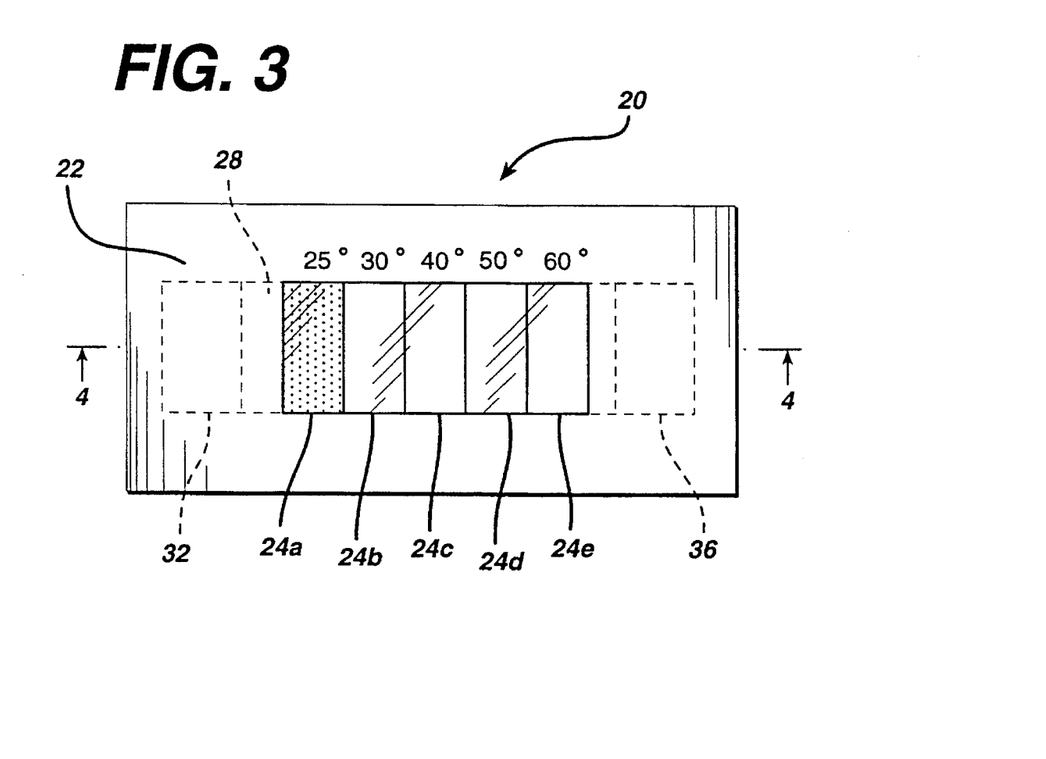
FIG. 3 is a plan view of a second embodiment of the time indicator of this invention.
Figure 4:
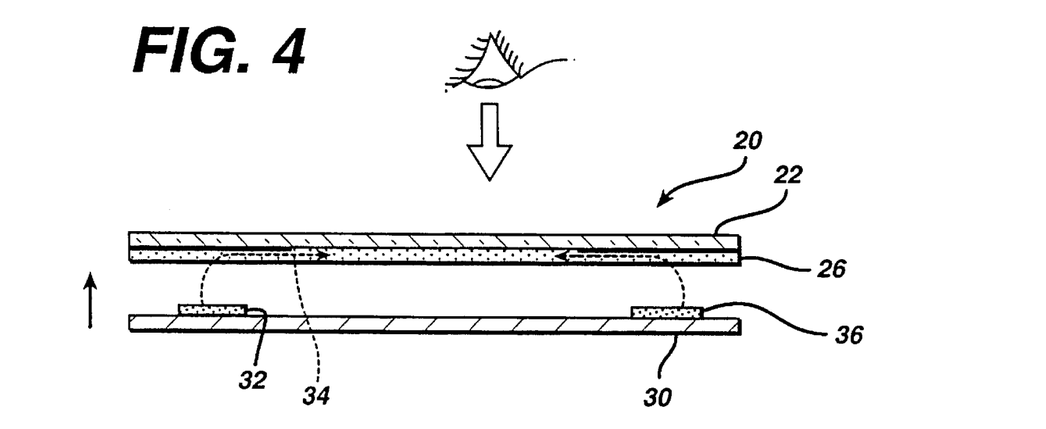
FIG. 4 is an exploded cross-sectional view taken along line 4—4 of FIG. 3.

Referring to the second embodiment of this invention depicted in FIGS. 3 and 4, wherein the aforedescribed elements have the same numbers, the time indicator 20 is an indicator which indicates the passage of, for example, one month. Display region 24a indicates one month if the ambient temperature is 25° F., 24b indicates one month if the ambient temperature is 30° F., 24c indicates one month if the ambient temperature is 40° F., and so on. The activating agent 34, e.g., a colored dye migrates laterally through the migration region 28. The migration region 28 is a thin adhesive coating. The predetermined amount of time is indicated when the dye 34 becomes visible through a window or display region 24(a–e).

In this second embodiment, because the activating agent 34 migration rate through the migration region 28 increases dramatically at higher temperatures it is desirable to have at least one second region 36 in the activation layer 30. This second region 36 includes a rate retarding agent 38. The rate retarding agent 38 is capable of migrating through the migration region toward an activation region, e.g. 24e. The rate retarding agent 38 is capable of retarding the migration of the activating agent or dye 34 in the migration region 28.

When the activation layer 30 is adhesively applied to the migration layer 26, each second region 36 overlies at least one migration region 28. The rate retarding agent 38 is then activated to migrate laterally from the second region 36 through the migration region 28 toward the activation region 32 to cause a retarding of the migration of the activating agent 34.

Figure 5:
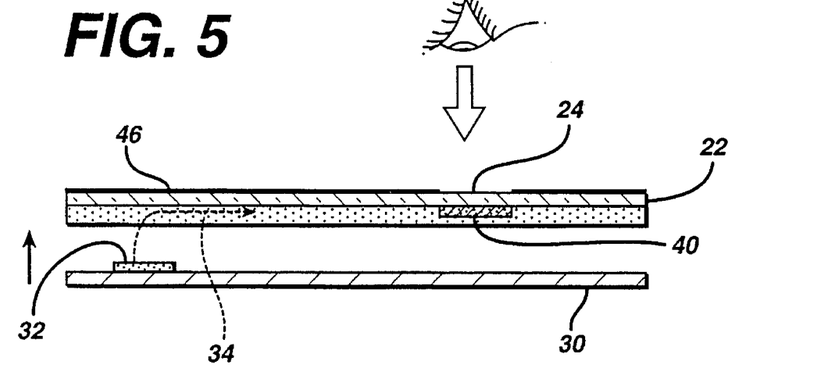
FIG. 5 is an exploded cross cross-sectional view of a third embodiment of the time indicator of this invention.

Referring to the third embodiment of this invention depicted in FIG. 5, wherein the aforedescribed elements have the same numbers, a dye precursor (colored or colorless) is the migrating chemical agent 34. At some distance from the activation region 32, preferably overlying the display region 22 is the dye forming region 40. Upon activation, the precursor migrating agent 34 migrates through the migration region 28 and diffuses into the dye forming region 40. The diffusion of the precursor migrating agent 34 into dye forming region 40 causes a color change to take place which can be viewed through the display region 22 providing an indication that the predetermined period of time has passed.

Referring to FIG. 5, the time indicator 20 can use a transparent display layer 22 because the precursor migrating agent 34 is colorless or of a different color than the color produced when it combines with the dye forming region 40.

Figure 6:
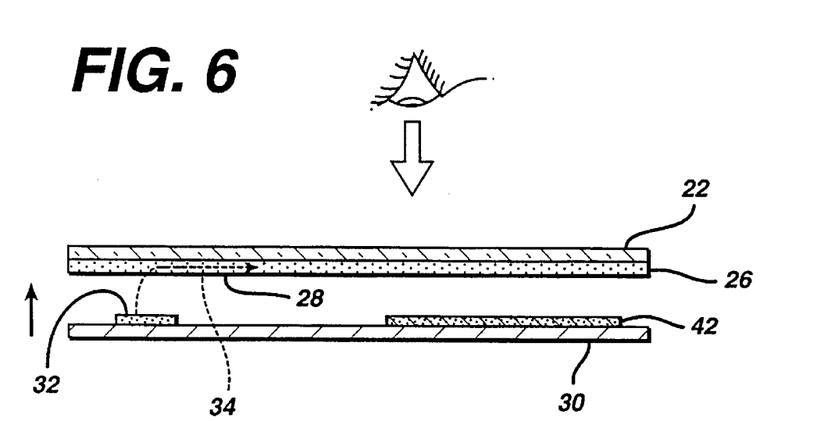
FIG. 6 is an exploded cross cross-sectional view of a fourth embodiment of the time indicator of this invention.

Referring to the fourth embodiment of this invention depicted in FIG. 6, wherein the aforedescribed elements have the same numbers, a migration layer 26 is provided having an adhesive associated therewith. The migration layer 26 is attached to display layer 22 and includes a migration region 28 through which the migrating agent 34 laterally passes. Activation layer 30 has thereon at least one activation region 32 that includes the migrating agent 34. On the activation layer 30 is a region 42 which contains a non-migrating dye. This region 42 is distal from the activating region 32. The migration region 28 connects the activation region 32 with this non-migrating dye region 42. The non-migrating dye is substantially non-migrating through the migration region 26, 28. The migration layer is opaque to this non-migrating dye at the display region above region 42.

Upon activation, the migrating agent 34 migrates through the migration region 28 to region 42. Upon contact with region 42 the migrating agent 34 activates the non-migrating dye to migrate through the migration layer 28 at the area of contact with region 42. This causes an indication in the display region 24 (which can be a transparent display layer 22) that the pre-determined amount of time has passed. Preferably, the migrating agent 34 contacts the non-migrating dye to solubilize the non-migrating dye to cause it to migrate through the migration layer 26. Optionally, the migrating agent 34 can cause the migration layer 26 to permit migration of the non-migrating dye therethrough. Preferably the migrating agent 34 is a plasticizer which accomplishes such.

Figure 7:
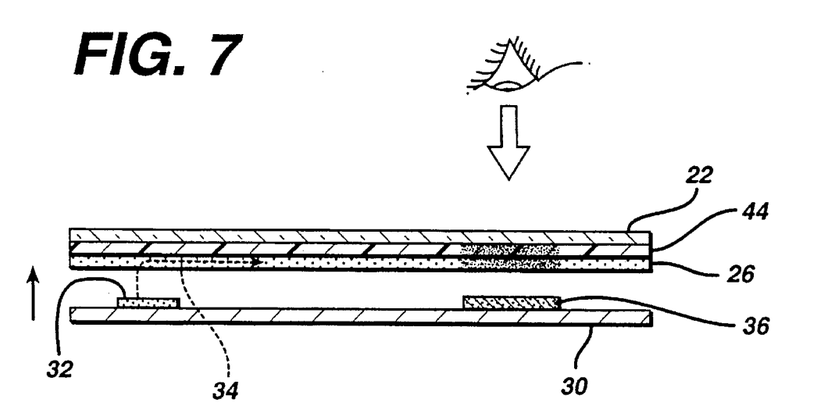
FIG. 7 is an exploded cross cross-sectional view of a fifth embodiment of the time indicator of this invention.

Referring to the fifth embodiment of this invention depicted in FIG. 7, wherein the aforedescribed elements have the same numbers, the time indicator 20 has between the migration layer 26 and transparent display layer 22, an opaque viewing layer 44. Preferably this is a white vinyl urethane film of about 1 mil. thick. The migrating agent 34 is a dye which migrates along a migration region 28 in migration layer 26. The migrating agent 34 cannot migrate through nor be seen through viewing layer 44. The agent 34, upon contacting second region 36 mixes or reacts with a plasticizer contained in region 36. This plasticizer causes the migrating agent 34, i.e. dye, to migrate through viewing layer 44 and appear at display region 22. The white viewing layer accents the color of the dye.

Figure 8:
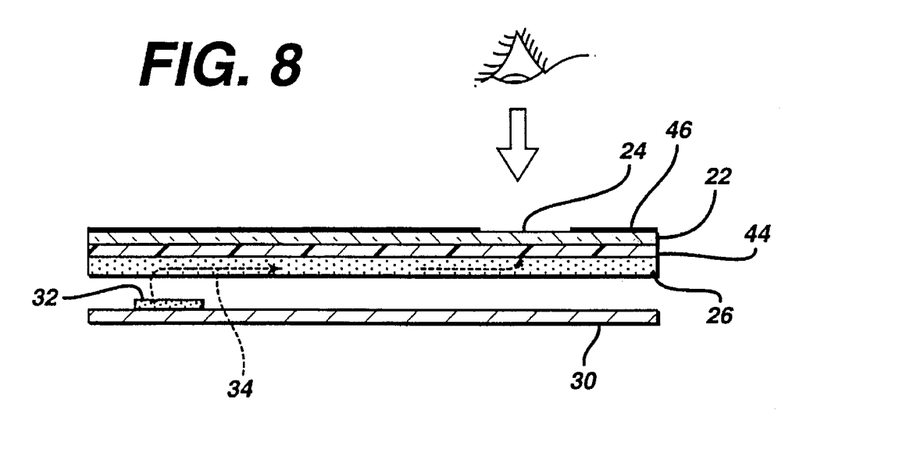
FIG. 8 is an exploded cross cross-sectional view of a sixth embodiment of the time indicator of this invention.

Referring to the sixth embodiment of this invention depicted in FIG. 8, wherein the aforedescribed elements have the same numbers, the time indicator 20 has between the migration layer 26 and transparent display layer 22, an opaque viewing layer 44. Preferably this is a white vinyl urethane film of about 1 mil. thick. Overlying display layer 22 is an opaque cover layer 46 having an opening therein through which the display region 24 can be viewed. Contained in the migration region 28, preferably admixed with the adhesive, is a dye which cannot be seen through opaque viewing layer 44, particularly at display region 24. The migrating agent 34 is an agent, e.g., plasticizer, that migrates along migration region 28 in migration layer 26. As the migrating agent 34 migrate through the migration region 28 it solubilizes the dye in the migration region 28 to pass through viewing layer 44. The opaque cover layer 46 prevents the dye from being seen until the migrating agent 34 reaches display region 24 after the predetermined period of time has passed. The white viewing layer 44 seen through the transparent display layer 22 in display region 24 accents the color of the dye when it passes through the viewing layer 44.

Figure 9:
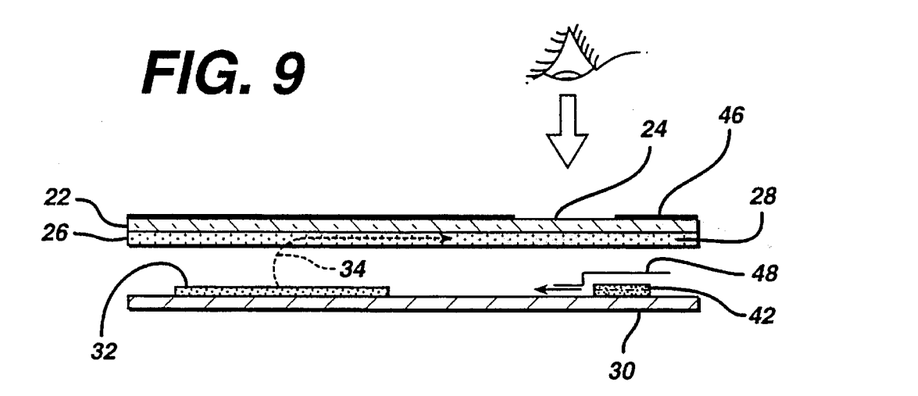
FIG. 9 is an exploded cross cross-sectional view of a seventh embodiment of the time indicator of this invention.

Referring to the seventh embodiment of this invention depicted in FIG. 9, wherein the aforedescribed elements have the same numbers, a migration layer 26 is provided having an adhesive associated therewith. The migration layer 26 is attached to a transparent display layer 22. Overlying display layer 22 is an opaque cover layer 46 having an opening therein through which the display region 24 can be viewed. The migration layer 26 includes migration region 28 through which the migrating agent 34 laterally passes. Activation layer 30 has thereon activation region 32 that includes the migrating agent 34. On activation layer 30 is a region 42 which contains a dye. This region 42 is distal from the activation region 32. The migration region 28 connects the activation region 32 with this region 42. Overlying region 42 is a dye barrier 48. The dye in region 42 is substantially non-migrating through the dye barrier 48. The dye barrier 48 is opaque to the dye at the display region above region 42. Upon activation, the migrating agent 34 migrates through the migration region 28 to region 42. Upon contact with the dye barrier 48 the migrating agent 34 causes the barrier 48 to permit the dye to migrate through the barrier layer 48 and along migration layer 26,28 at the area of contact to cause an indication in the display region 24 in the transparent display layer 22 that the pre-determined amount of time has passed. Because the dye in region 42 is close to display region or viewing window 24, it rapidly changes color under the viewing window 24. Preferably, the migrating agent 34 is a plasticizer which accomplishes such.

Figure 10:
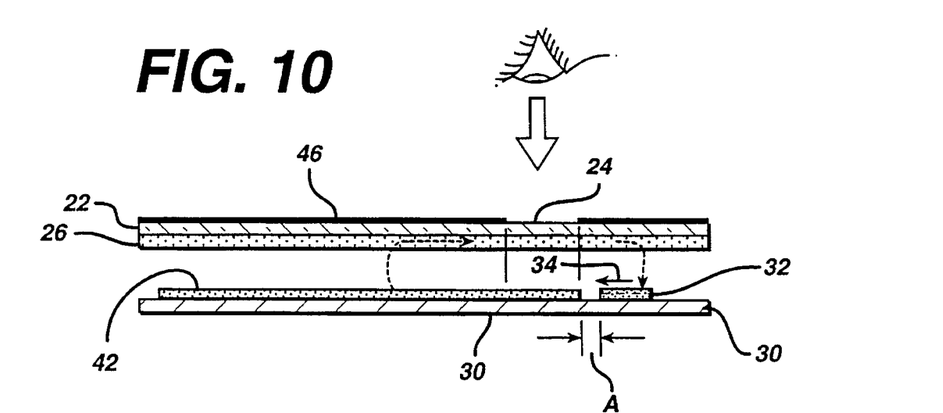
FIG. 10 is an exploded cross cross-sectional view of a eighth embodiment of the time indicator of this invention.

Referring to the eighth embodiment of this invention depicted in FIG. 10, wherein the aforedescribed elements have the same numbers, a migration layer 26 is provided having an adhesive associated therewith. The migration layer 26 is attached to a transparent display layer 22. Overlying display layer 22 is an opaque cover layer 46 having an opening therein through which the display region 24 can be viewed. The migration layer 26 includes migration region 28 through which the migrating agent 34, a migrating dye, laterally passes. The distance the migrating agent 34 e.g., dye migrates through migration layer 26 is A until it reaches the beginning of the display region 24. Activation layer 30 has thereon activation region 32 that includes the migrating dye 34. Overlying the migration layer 26 is a region 42 which contains a plasticizer. This region 42 is distal from the activating region 32 and overlies the display region 24. The migration region 28 connects the activation region 32 with this region 42. Upon activation, the migrating dye 34 migrates through the migration region 28 to region 42. Upon contact with region 42, due to the presence of the plasticizer, the migrating dye 34 immediately traverses the display region 24 along migration layer 26,28 at the area of contact to cause an indication in the display region 24 in the transparent display layer 22 that the pre-determined amount of time has passed.

The elements from which the time indicators of this invention are make are known in the art, as exemplified by the numerous prior art references cited herein. By way of example, the elements of this invention can be constructed of the following materials:

The display layer 22- DuPont Mylar A, 2 mils.

The migration layer 26- Clear H&N #213 acrylic having added thereto about 20%, by weight, titanium dioxide, to make the layer opaque.

The migration region 28- Clear H&N #213 or #287 acrylic having added thereto about 20% by weight titanium dioxide, to make the layer opaque.

The activation layer 30- Dupont Mylar A, 2 mils; Cadillic Plastic Corp., PET, 2 mils.

The activation region 32- Oxychem PVC 160; Polyurethane Specialty, Inc. BC 200.

The activating agent 34- C.P. Hall Plasticizer DMP, DEP, DBP or Plasthall 550.

The second region 36- Oxychem PVC 160; Polyurethane Specialty, Inc. BC 200.

The rate retarding agent 38- C.P. Hall Plasticizer C.P. 25 or 59.

The non-migrating dye 42- Compton & Knowles Intertherm Scarlet #256.

The white or opaque viewing layer 44- B.F. Goodrich Co. PVC #110X334.

The white or opaque cover layer 46- Environment Ink Company, opaque white.

The dye barrier 48- Oxychem PVC 410 or B.F. Goodrich Co. PVC #110X334.

Modifications of the foregoing may be made without departing from the spirit and scope of the invention. What is desired to be protected by Letters Patents is set forth in the appended claims.

What is claimed is:

1. A time indicator comprising:

a display layer having a defined display region therein;

a migration layer overlying and attached to the display layer, the migration layer having a migration region therein, the migration region in contact with the display region at a display region contact area;

an activation layer having a defined activation region therein, wherein the activation region includes a migrating agent capable of migrating laterally through the migration region, wherein when the activation layer overlies the migration layer, the activation region overlies the migration region, the migration region connecting the activation region with the display region which is laterally distal from the activation region at the display region contact area;

adhesive means associated with the activation layer or migration layer for adhesively attaching the activation layer to the migration layer;

whereby when the activation layer is contacted with and overlies the migration layer, the adhesive means adhesively attaches the activation layer to the migration layer causing the activation region to contact the migration region, wherein the migrating agent is activated to migrate laterally from the activation region through the migrating region to the display region contact area in contact with the display region in a predetermined amount of time to cause an indication in the display region that the predetermined amount of time has elapsed.

2. The time indicator of claim 1, wherein their are a plurality of display regions.

3. The time indicator of claim 1, wherein their are a plurality of migration regions.

4. The time indicator of claim 1, wherein their are a plurality of activation regions.

5. The time indicator of claim 1, wherein the migrating agent is a migrating dye which migrates through the migrating region.

6. The time indicator of claim 1, further comprising:

a non-migrating dye overlying the migration layer at the display region contact area, the non-migrating dye being substantially non-migrating through the migration layer and the migration layer being opaque to the non-migrating dye at the display region contact area;

wherein when the migrating agent migrates to the display region contact area it activates the non-migrating dye to migrate through the migration layer at the area of contact to cause an indication in the display region that the predetermined amount of time has elapsed.

7. The time indicator of claim 6, wherein the migrating agent contacts the non-migrating dye to solubilize the dye causing it to migrate through the migration layer.

8. The time indicator of claim 6, wherein the migrating agent causes the migration layer in the display region contact area to permit migration of the non-migrating dye through the migration layer.

9. The time indicator of claim 8, wherein the migrating agent is a plasticizer for the migrating layer.

10. The time indicator of claim 1, further comprising:

a second region in the activation layer which includes a rate retarding agent, the rate retarding agent capable of migrating through the migration region toward the activation region and retarding the migration of the activating agent in the migration region;

wherein when the activation layer overlies the migration layer, the second region overlies the migration region, whereby when the activation layer is contacted with and overlies the migration layer, the second region contacts the migration region and the rate retarding agent is activated to migrate laterally from the second region through the migrating region to the activation region to cause a retarding of the migration of the activating agent.

* * * * *